United States Patent [19]

Grego

[11] Patent Number: 5,044,726
[45] Date of Patent: Sep. 3, 1991

[54] DEVICE FOR THE CORRELATION BETWEEN OPTICAL BEAMS

[75] Inventor: Giorgio Grego, Venaria, Italy

[73] Assignee: Cselt Centro Studi E Laboratori Telecomunicazioni S.P.A., Turin, Italy

[21] Appl. No.: 499,762

[22] Filed: Mar. 26, 1990

[30] Foreign Application Priority Data

Mar. 24, 1989 [IT] Italy ................................ 67208 A/89

[51] Int. Cl.$^5$ ............................ G02F 3/00; H01S 3/30
[52] U.S. Cl. .................................... 359/561; 364/822; 372/40; 359/333
[58] Field of Search ........................ 350/3.64, 162.13; 307/425, 428; 356/354; 372/6, 40; 330/4, 4.3; 364/822

[56] References Cited

U.S. PATENT DOCUMENTS

| | | | |
|---|---|---|---|
| 3,309,526 | 3/1967 | Giordmaine | 307/425 |
| 3,629,602 | 12/1971 | Firester | 307/425 |
| 3,646,358 | 2/1972 | Firester | 307/425 |
| 3,711,787 | 1/1973 | Snitzer et al. | 372/40 |
| 4,383,734 | 5/1983 | Huignard et al. | 350/162.13 |
| 4,514,038 | 4/1985 | Pichon et al. | 350/162.13 |
| 4,527,132 | 7/1985 | Huignard | 307/428 |
| 4,563,091 | 1/1986 | Dandliker | 356/354 |
| 4,778,261 | 10/1988 | Boyd et al. | 350/354 |
| 4,782,491 | 11/1988 | Snitzer | 372/6 |
| 4,847,521 | 7/1989 | Huignard et al. | 307/425 |
| 4,880,996 | 11/1989 | Peterson et al. | 307/425 |
| 4,922,496 | 5/1990 | Po | 372/6 |

OTHER PUBLICATIONS

Amnon, Yariv, "Parametric Amplification. Oscillation, and Fluorescence," Chapter 17, *Quantum Electronics*, 2nd ed., John Wiley, New York, 1975, pp. 437–469.

Paul Urquhart, Review of Rare Earth Doped Fibre Lasers and Amplifiers, IEE Proceedings, vol. 135, PTJ, No. 6, Dec. 1988, pp. 385–406.

*Primary Examiner*—Bruce Y. Arnold
*Assistant Examiner*—Martin Lerner
*Attorney, Agent, or Firm*—Herbert Dubno

[57] ABSTRACT

A device for the correlation between optical beams having spatially modulated intensities has an active glass window, which on one side is illuminated at the same time by a reading and a pumping beam through one or a plurality of semitransparent mirrors. The reading beam has radiations with a wavelength equal to that of a transition between an intermediate and fundamental energy level. The pump beam has radiations with a wavelength corresponding to the energy of the highest power level of the material forming the active glass, obtaining on the other side of the window a light beam representing the correlation between the pumping and reading beams.

4 Claims, 2 Drawing Sheets

DEVICE FOR THE CORRELATION BETWEEN OPTICAL BEAMS

FIELD OF THE INVENTION

My present invention relates to a device for processing optical signals in the field of optical computing and image recognition and, more particularly, to a device for correlation of optical beams.

BACKGROUND OF THE INVENTION

Full optical devices implementing correlation functions between light beams are required in the field of information processing by optical techniques.

Such operations are particularly useful whenever automatic image recognition by comparison with a much larger image or with a series of images is required. In this way a particular geographical area can be identified within a wide terrestrial celestial area, the presence of a word in a text can be detected, et cetera. In these cases the comparison is generally made between two optical beasm whose intensity is spatially modulated by the respective images or by their Fourier Transforms and the recognition takes place in correspondence with the maximum of a correlation function detected by a suitable analyzer.

Also in the domain of information processing by optical computers logical operations are to be effected between binary digit matrices transferred on optical beams, wherein the presence of absence of light at different points is associated with a different logic level. By spatial and/or time correlation between two beams of its kind, the known logic function AND, OR etc can be obtained, while operating at the same time on a great number of parallel binary digits, thereby obtaining a large processing capacity.

Devices capable of carrying out the correlation between light beams are now well known. These include the so-called LCLV (Liquid Crystal Light Valve) described in the paper "Digital Optical Computing" by Alexander A. Sawchuk et al., issued in Proceedings of the IEEE, vol. 72, No. 7, July 1984. These devices consist of a layer of semiconducting material CdS, forming a photoconducting surface, and of a liquid crystal surface, separated by an opaque layer, by a reflecting layer and by an insulating layer. Two external transparent and electroconducting surfaces allow the application of an a.c. biasing voltage. A light beam incident on the photoconducting surface causes a variation of the input impedance of this layer at different points proportionally to spatial light intensity distribution, and hence a variation of the voltage drop across the adjacent liquid crystal layer, thus obtaining a corresponding variation of crystal orientation. By sending towards the liquid crystal surface a polarized light beam, a reflected beam is obtained with polarization varying at different points as a function of the liquid crystal rotation angle. If the reflected beam is examined by a suitable polarization analyzer, an intensity-modulated beam is obtained according to a beam incident onto the photoconducting surface. However, this device has a number of limitations due both to the electro-optical conversion operated between the different layers, and to the use of liquid crystals. In fact the maximum spatial resolution is about 40 lines/mm and the response time is of 30 ms.

OBJECTS OF THE INVENTION

The object of the invention is to provide an improved device for the correlation between optical beams, which does not require any electrical biasing, allows a resolution near the maximum wavelength of the incident beams and has a response time close to that of the electronic transitions between different atomic energy levels.

SUMMARY OF THE INVENTION

The present invention provides a device for the correlation between optical beams having spatially modulated intensities, which comprises an active-glass window, which on one side is illuminated by the reading beam as well as by the pump beam through one or more semitransparent mirrors, the reading beam consisting of radiation with a wavelength equal to the wavelength of a transition between intermediate and fundamental energy levels of the active glass and the pump beam consisting of radiation with a wavelength corresponding to the highest energy level of the material forming the active glass, thus obtaining on the other side of the window a light beam corresponding to the correlation between the two beams above.

BRIEF DESCRIPTION OF THE DRAWINGS

The foregoing and other characteristics of the present invention will be made clearer by the following description of a preferred embodiment of the same, given by way of non-limiting example, and with reference to the annexed drawing wherein.

SPECIFIC DESCRIPTION

Figure 1:
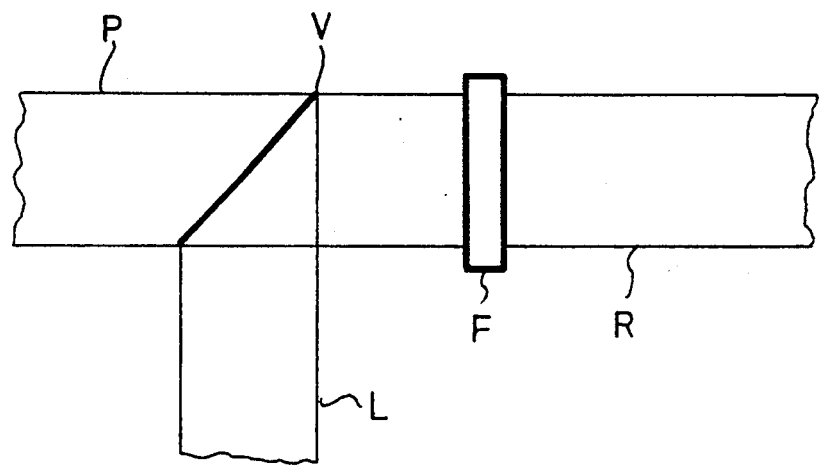
FIG. 1 is a schematic representation of the device.

The device shown in FIG. 1 uses a window F made of active glass. As known, active glasses are rare-earth doped silica, fluorozirconate glasses or the like, used to implement lasers and optical fiber amplifiers, as described e.g. in the paper entitled "Review of rare earth doped fiber lasers and amplifiers" by Paul Urquhart, issued on IEE Proceedings, vol. 135, Pt.J. No. 6, December 1988. These glasses, when illuminated by a light radiation at a certain wavelength, termed the pump radiation, produce a fluorescence on a greater wavelength. In fact, pump radiation gives rise to transitions of the electrons present in active-glass moleculae from a fundamental or base energy level to a higher energy level. Hence said electrons nonradiatively decay after a certain relaxing time to an intermediate level, with photon creation. From its intermediate energy level the electrons radiatively decay to the fundamental energy level emitting lower energy photons. If the number of electrons at the fundamental state is higher than that at the excited state, an incident photon with energy corresponding to energetic gap of de-excitation can be absorbed, with consequent attenuation of transitting light beam. If, however, the number of the electrons at the excited state is higher than the number of electrons at the fundamental state, i.e. if a population inversion has taken place, the transitting light beam can be amplified. Of course, if a population balance exists, the active glass is perfectly transparent. It is also possible to obtain active glasses with materials wherein two intermediate levels instead of one exist; these materials require lower pump energy.

Window F made of active glass is illuminated at the same time by pump, or writing, beam P and by reading beam L through a semitransparent mirror V. Of course, beam P consists of radiation with wavelength corresponding to a pumping wavelength for the active glass and beam L of radiations with a wavelength corresponding to that of a transition between intermediate and fundamental energy levels. As a function of spatial power distribution of writing beam P, the spatial transmittance of active glass window passes from minimum values, with correspondent attenuation, to higher values, till perfect transparency and possibly amplification is obtained. Power levels allowing amplification are not required, but a certain degree of transmittance variation is sufficient to modulate reading beam L by writing beam P and hence to obtain at window F output a light beam P representing the correlation between the other two beams L and P. The resulting beam can then be sent to a suitable optical system, to a Fourier filter or to an analyzer, according to the domain of use of the device.

This device can be used in a Mach-Zender interferometer to obtain a phase-shift of variable entity of one of the two interfering light beams.

Figure 2:
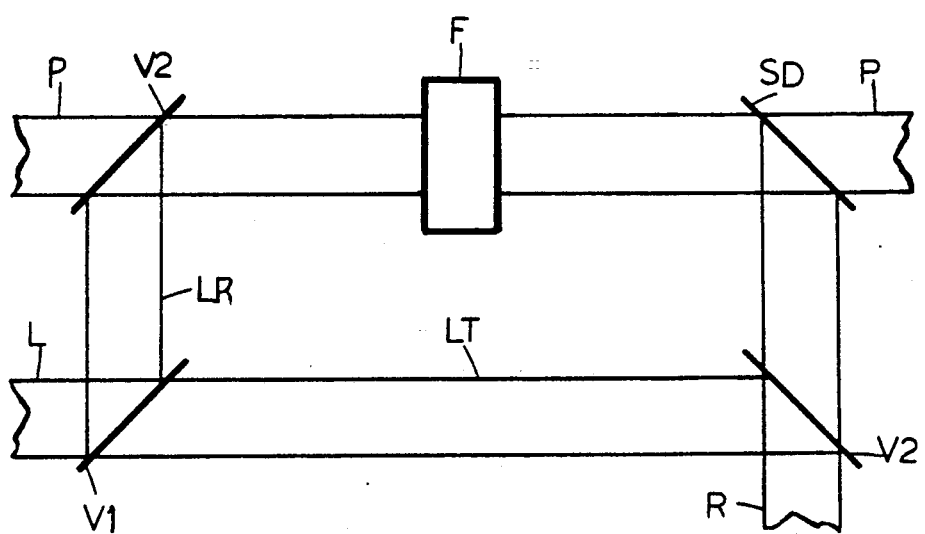
FIG. 2 shows a Mach-Zender interferometer using the device of FIG. 1.

In the interferometer shown in FIG. 2, the reading beam L is sent towards a semi-transparent mirror V1, which reflects a part LR towards a second semi-transparent mirror V2, which in turn reflects it towards active-glass window F. Also a pump beam P transits through semitransparent glass V2 and impinges upon the surface of the active glass window F. In as a function of the optical power of the pump beam, transparency characteristics of window V change, passing, as seen, from attenuation to amplification. These variations are fully equivalent to refractive index variations, and hence to variations of the optical path, which as is known, is given by the product of the refractive index and the thickness of the active glass window F. A variation of the optical path causes a variation of the phase of the wavefront of the reading beam outgoing from F, which phase depends on the pump beam power.

At the output from window F a dichroic mirror SD allows pump beam P to pass undisturbed, since it is no longer necessary, and the reading beam to be reflected towards a third semi-transparent mirror V3, whereto also part LT of original beam L arrives without undergoing phase shift. Mirror V3 is oriented so as to produce interference between the reading beam which has not been phase-shifted and the beam which has been phase-shifted by active-glass window F. Hence the resulting beam R will present maximum intensity if phase-shift between the interfering beams is an even multiple of 180° and minimum intensity if phase-shift is equal to an odd multiple of 180°. Thus an intensity-modulation is obtained of the resulting beam R which is dependent on intensity of pump beam P. In the case in which the pump beam presents spatial intensity variations, the resulting beam will also present analogous variations, while if both beams P and L present spatial intensity variations, the resulting beam will present a spatial intensity modulation which is the correlation of intensity of beams P and L.

It is clear that what has been described has been given only by way of non-limiting example. Variations and modifications are possible without going out side the scope of claims. For instance, the correlation can be performed between more than two beams, causing them to impinge upon the active glass window after being duly directed by a plurality of semitransparent mirrors placed in series.

I claim:

1. A device for obtaining the correlation between optical beams having spatially modulated intensities, comprising an active-glass window composed of a material capable of light-stimulated photon emission, means for directing against said window from one side a reading beam and a pump beam and including at least one semitransparent mirror, the reading beam consisting of a radiation with a wavelength equal to a wavelength of transition between an intermediate and a fundamental energy level of the active glass window and the pump beam consisting of a radiation with a wavelength corresponding to a highest energy level of the active glass window; and means on the other side of the window for obtaining a light beam carrying a correlation between the reading and pump beams.

2. A device as defined in claim 1 wherein the power of said pump beam is such that a spatial transmittance of said active glass window passes from a minimum value, in correspondence of which there is attenuation, to a higher value until a perfect transparency is attained.

3. A device as defined in claim 1 wherein the power of the pump beam is such that a spatial transmittance of active glass window passes from a minimum value in correspondence of which there is attenuation, to a higher value at which optical amplification by said window is reached.

4. A device as defined in claim 1 forming part of an interferometer to shift, as a function of power of the pump beam, a phase of a wavefront of a part of the reading beam, said device further comprising means causing said part of said reading beam to interfere with the other part of reading beam with unshifted phase for obtaining a resulting beam whose spatial intensity depends on the intensity of the pump beam.

* * * * *